(12) United States Patent
Nakao et al.

(10) Patent No.: US 7,468,771 B2
(45) Date of Patent: Dec. 23, 2008

(54) LIQUID CRYSTAL DISPLAY PANEL AND METHOD FOR MANUFACTURING THE SAME

(75) Inventors: Kenji Nakao, Kanazawa (JP); Shinji Ogawa, Ishikawa-gun (JP); Naoya Kubota, Ishikawa-gun (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 592 days.

(21) Appl. No.: 11/138,459

(22) Filed: May 27, 2005

(65) Prior Publication Data

US 2006/0007378 A1  Jan. 12, 2006

(30) Foreign Application Priority Data

May 28, 2004  (JP) .............................. 2004-159659

(51) Int. Cl.
*G02F 1/1337* (2006.01)
*G02F 1/1333* (2006.01)

(52) U.S. Cl. ........................ 349/126; 349/123; 349/94

(58) Field of Classification Search ................ 349/126, 349/123, 94
See application file for complete search history.

(56) References Cited

U.S. PATENT DOCUMENTS

| | | | |
|---|---|---|---|
| 6,678,034 B2 * | 1/2004 | Choi et al. | 349/172 |
| 6,753,551 B2 * | 6/2004 | Cheng | 257/79 |
| 6,833,893 B2 * | 12/2004 | Kikkawa | 349/117 |
| 6,873,377 B2 * | 3/2005 | Konno et al. | 349/33 |
| 7,030,848 B2 * | 4/2006 | Sato et al. | 345/95 |
| 7,050,031 B2 * | 5/2006 | Saishu et al. | 345/96 |

FOREIGN PATENT DOCUMENTS

| | | | |
|---|---|---|---|
| JP | 3-118519 | * | 5/1991 |
| JP | 9-54325 | * | 2/1997 |
| JP | 2003-280005 | * | 10/2003 |
| JP | 2003-280012 | | 10/2003 |
| KR | 2002-0011112 | | 2/2002 |

OTHER PUBLICATIONS

U.S. Appl. No. 11/138,459, filed May 27, 2005, Nakao, et al.
U.S. Appl. No. 11/138,461, filed May 27, 2005, Nakao, et al.
U.S. Appl. No. 11/138,460, filed May 27, 2005, Nakao, et al.

* cited by examiner

*Primary Examiner*—Mike Qi
(74) *Attorney, Agent, or Firm*—Oblon, Spivak, McClelland, Maier & Neustadt, P.C.

(57) ABSTRACT

An OCB mode liquid crystal display panel comprises a pair of electrode substrates, a liquid crystal layer which is held between the pair of electrode substrates and has liquid crystal molecules whose alignment state is controlled within a display area by a drive voltage applied from the electrode substrates, and a pair of alignment films which are disposed on the electrode substrates in contact with the liquid crystal layer and whose rubbing directions are set parallel to each other. The concentration of the impurity ions contained in that part of the liquid crystal layer which is located inside the display area is lower than the concentration of the impurity ions contained in that part of the liquid crystal layer which is located outside the display area.

8 Claims, 5 Drawing Sheets

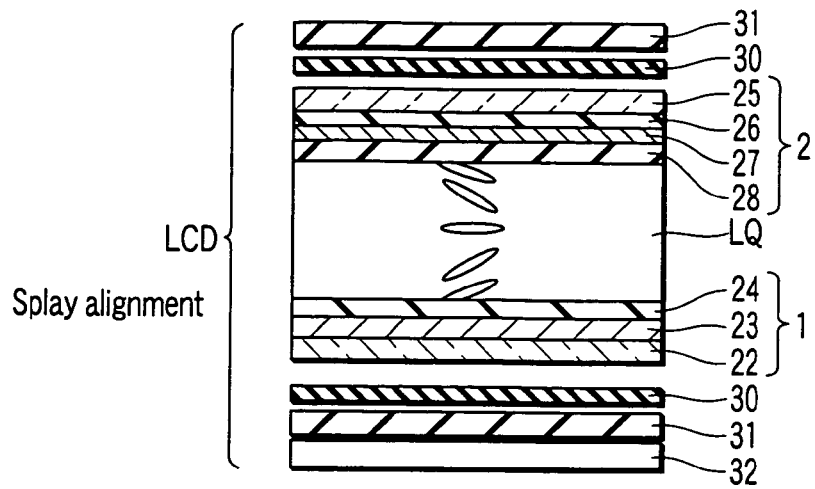
FIG. 3A  LCD Splay alignment
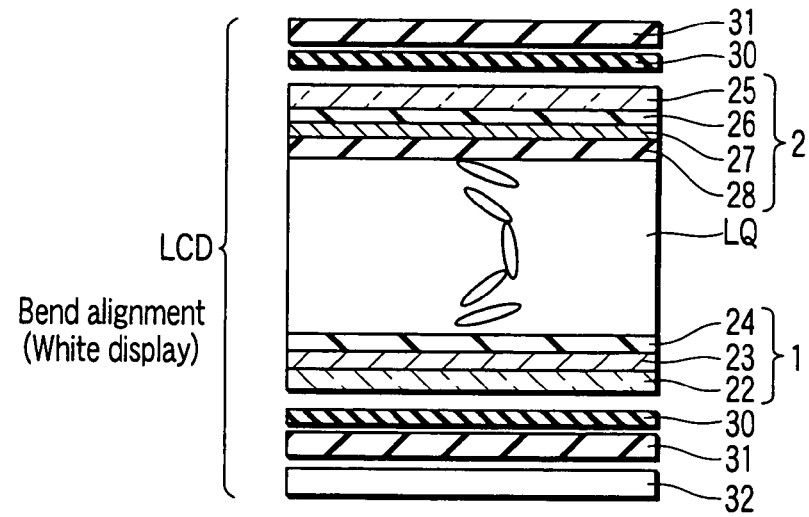
FIG. 3B  LCD Bend alignment (White display)
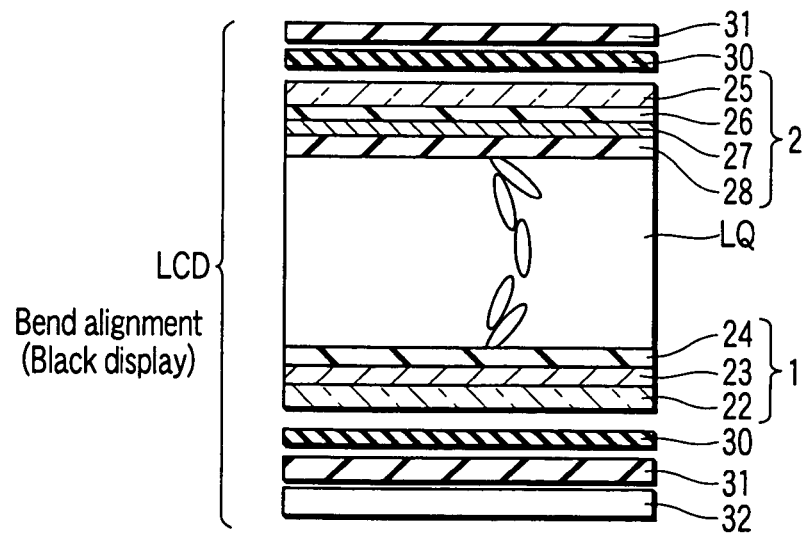
FIG. 3C  LCD Bend alignment (Black display)

LIQUID CRYSTAL DISPLAY PANEL AND METHOD FOR MANUFACTURING THE SAME

CROSS-REFERENCE TO RELATED APPLICATIONS

This application is based upon and claims the benefit of priority from prior Japanese Patent Application No. 2004-159659, filed May 28, 2004, the entire contents of which are incorporated herein by reference.

BACKGROUND OF THE INVENTION

1. Field of the Invention

The present invention relates to a liquid crystal display panel having an optically compensated bend (OCB) mode and a method for manufacturing the same.

2. Description of the Related Art

Liquid crystal display panels have widely been used as image displays for computers, automobile navigation systems, monitors and TVs. TN and STN modes, using nematic liquid crystals are popular as liquid crystal display modes for the liquid crystal display panels. Other liquid crystal display modes using ferroelectric liquid crystals and the like are also known and provide a higher response speed and a wider viewing angle. These display modes, however, require further improvement in impact resistance and thermal properties. In contrast, as an optically compensated liquid crystal display mode that provides a higher response speed and a wider viewing angle, there is an OCB mode in which liquid crystal molecules are aligned in parallel without being twisted. This OCB mode is focused on use in video equipment and active development thereof has been carried out.

In general, an active matrix liquid crystal display panel has a structure in which a liquid crystal layer is held between an array substrate and a counter substrate. The array substrate includes a plurality of pixel electrodes arrayed substantially in a matrix, a plurality of scanning electrodes disposed along rows of the pixel electrode, a plurality of data signal electrodes disposed along columns of the pixel electrodes, and a plurality of switching elements disposed near intersections between the scanning electrodes and the data signal electrodes, for example. Each of the switching elements is formed, for example, of a thin-film transistor (TFT), and turns on to apply the potential of one data signal electrode to one pixel electrode when one scanning electrode is driven. On the counter substrate, a counter electrode is disposed to face the plurality of pixel electrodes arrayed on the array substrate. A pair of pixel and counter electrodes forms one pixel together with a pixel area of the liquid crystal layer, and the alignment state of liquid crystal molecules within the pixel area is controlled by the electric field corresponding to the drive voltage held between the pixel electrode and the counter electrode.

In an OCB mode liquid crystal display panel, the liquid crystal molecules are in a splay alignment before supply of power. This splay alignment is a state where the liquid crystal molecules are laid down, and obtained by alignment films which are disposed on the pixel electrode and the counter electrode and rubbed in parallel with each other. A display operation of the liquid crystal display panel begins after an initialization process for applying a transfer voltage to the liquid crystal layer upon supply of power to transfer the alignment state of the liquid crystal molecules from the splay alignment to a bend alignment by a relatively strong electric field corresponding to the transfer voltage. The alignment state of the liquid crystal molecules is maintained in the bend alignment during the display operation, so as to attain the higher response speed and wider viewing angle peculiar to the OCB mode.

In addition, the alignment state of the liquid crystal molecules is inverse-transferred from the bend alignment to the splay alignment when a long period has elapsed in a no-voltage-applied state or a voltage-applied state where a voltage is applied but this voltage is below a level at which the energy of the splay alignment and the energy of the bend alignment are balanced. In the OCB mode liquid crystal display panel, black insertion driving is employed as a driving system for preventing the inverse transfer. In black insertion driving, an inverse-transfer preventing voltage and a display voltage corresponding to a video signal are alternately applied to the liquid crystal layer as the drive voltage at every frame cycle to maintain the bend alignment. Since the OCB mode liquid crystal display panel is a display panel of a normally white mode, the inverse-transfer preventing voltage corresponds to a voltage for a black display. Thus, this driving scheme is called black insertion driving. Further, the ratio of a period of applying the inverse-transfer preventing voltage to the total period of applying the display voltage and the inverse-transfer preventing voltage is called black insertion ratio.

In manufacture of the liquid crystal display panel, as shown in FIG. 5A, after an array substrate 1 and a counter substrate 2 are individually formed, rubbing treatment is applied to the alignment films on the array substrate 1 and the counter substrate 2. Thereafter, the array substrate 1 and the counter substrate 2 are bonded by use of a sealing resin layer 3. The sealing resin layer 3 is applied to surround a liquid crystal filling space and form an open part left as an inlet 4. Driver circuit elements are disposed along a first side of the array substrate 1, and the inlet 4 is disposed near a second side of the array substrate 1 that is opposed to the first side. The rubbing treatment for each alignment film is carried out in the same direction from the second side to the first side so as to avoid electrostatic destruction of the driver circuit elements. In FIG. 5A, RD1 denotes the rubbing direction of the alignment film on the array substrate 1, and RD2 denotes the rubbing direction of the alignment film on the counter substrate 2. A liquid crystal material is applied from the inlet 4 to the liquid crystal filling space as the liquid crystal layer LQ, and the inlet 4 is sealed with a sealing member 5.

It is inevitable that impurity ions get into the liquid crystal layer LQ during the above-mentioned manufacturing process. Specifically, the sealing member 5 is the main impurity ion source that supplies a significant quantity of impurity ions to the liquid crystal layer LQ. Such impurity ions decrease the insulation resistance of the liquid crystal. Thus, the display characteristics are impaired due to decreased voltage retention. Further, upon application of the drive voltage, the impurity ions are moved in the liquid crystal layer LQ. When the impurity ions are distributed unevenly, an image fault such as non-uniformity in display occurs. For example, Jpn. Pat. Appln. KOKAI Publication No. 9-54325 discloses a technique of providing an ion trap electrode in addition to electrodes arranged in one direction on a substrate and sequentially applying a high potential pulse to the electrodes to prevent uneven distribution of the impurity ions. However, it is difficult to use this technique as a solution to the problem occurring in the OCB mode liquid crystal display panel.

In the OCB mode liquid crystal display panel, liquid crystal molecules within the liquid crystal layer LQ are set in a bend alignment to perform a display operation. The orientation angle of each liquid crystal molecule significantly changes between a white display state in which a small voltage is applied to the liquid crystal layer LQ and a black display state in which a large voltage is applied to the liquid crystal layer LQ. The change in the orientation angle causes drifting of the liquid crystal molecules. Thus, a flow of the liquid crystal molecules in the drift direction occurs in the liquid crystal layer LQ. The direction of this flow coincides with the rubbing directions of the alignment films for aligning the liquid crystal molecules in the OCB mode liquid crystal display panel. When impurity ions are moved by the flow in the rubbing directions RD1 and RD2 shown in FIG. 5A, the impurity ions DF having high concentration in the vicinity of the inlet 4 are diffused in the liquid crystal layer LQ as shown in FIG. 5B. Further, non-uniformity in display occurs because the electric charge retention is locally decreased as a result of continuous black insertion driving. This can be confirmed, for example, by an operation of continuously displaying an image of a test pattern shown in FIG. 5C in the form of black insertion driving and then displaying an image of a whole black pattern. In this case, the later image is not displayed entirely in black, and gray stripes shown in FIG. 5D are observed as burn-in portions. As shown in FIG. 5C, the impurity ions drift from the white display regions and concentrated in the black display regions. The gray stripes are created in portions where the electric charge or applied voltage retention is locally decreased by the concentrated impurity ions.

It is difficult to solve the burn-in problem occurring in the OCB mode liquid crystal display panel by applying a high potential pulse in the same manner as the above-mentioned technique.

BRIEF SUMMARY OF THE INVENTION

It is an object of the present invention to provide an OCB mode liquid crystal display panel that can suppress non-uniformity in display caused by impurity ions when black insertion driving is carried out in a display operation, and a method for manufacturing the OCB mode liquid crystal display panel.

According to the invention, there is provided a method for manufacturing an OCB mode liquid crystal display panel, which comprises steps of: forming a pair of electrode substrates, a liquid crystal layer which is held between the pair of electrode substrates and has liquid crystal molecules whose alignment state is controlled within a display area by a drive voltage applied from the electrode substrates, and a pair of alignment films which are disposed on the electrode substrates in contact with the liquid crystal layer and whose rubbing directions are set parallel to each other, as one display panel; and performing an aging process for obtaining a flow of the liquid crystal molecules in the rubbing directions of the alignment films by applying to the liquid crystal layer a drive voltage that periodically changes in a black insertion ratio determined independently from that of black insertion driving for preventing the alignment state of the liquid crystal molecules from being inverse-transferred from a bend alignment to a splay alignment, the aging process being continued for a predetermined period required for moving impurity ions contained in the liquid crystal layer outside the display area.

According to the invention, there is provided an OCB mode liquid crystal display panel, which comprises: a pair of electrode substrates; a liquid crystal layer which is held between the pair of electrode substrates and has liquid crystal molecules whose alignment state is controlled within a display area by a drive voltage applied from the electrode substrates; and a pair of alignment films which are disposed on the electrode substrates in contact with the liquid crystal layer and whose rubbing directions are set parallel to each other; wherein the concentration of the impurity ions contained in that part of the liquid crystal layer which is located inside the display area is lower than the concentration of the impurity ions contained in that part of the liquid crystal layer which is located outside the display area.

With the OCB mode liquid crystal display panel and the method for manufacturing this panel, the concentration of the impurity ions contained in that part of the liquid crystal layer which is located inside the display area is lower than the concentration of the impurity ions contained in that part of the liquid crystal layer which is located outside the display area, as a result of the aging process performed during the manufacture. Thus, it is possible to reduce the quantity of impurity ions locally concentrated in the display area during the black insertion driving for a display operation, thereby suppressing non-uniformity in display caused by the concentrated impurity ions.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate an embodiment of the invention, and together with the general description given above and the detailed description of the embodiment given below, serve to explain the principles of the invention.

FIGS. 3A to 3C are diagrams showing the cross sectional structure and the liquid crystal alignment of the OCB mode liquid crystal display panel shown in FIG. 1;

DETAILED DESCRIPTION OF THE INVENTION

An OCB mode liquid crystal display panel LCD according to one embodiment of the present invention will be described with reference to the accompanying drawings.

Figure 1:
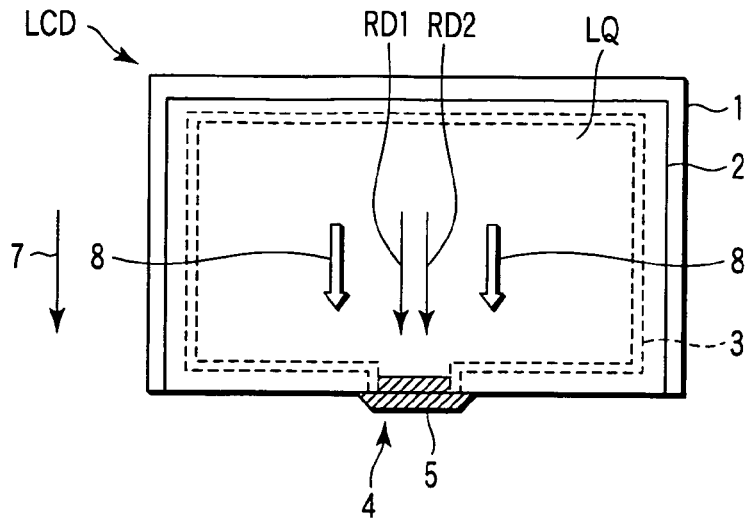
FIG. 1 is a diagram showing the plane structure of an OCB mode liquid crystal display panel according to one embodiment of the invention.
Figure 2:
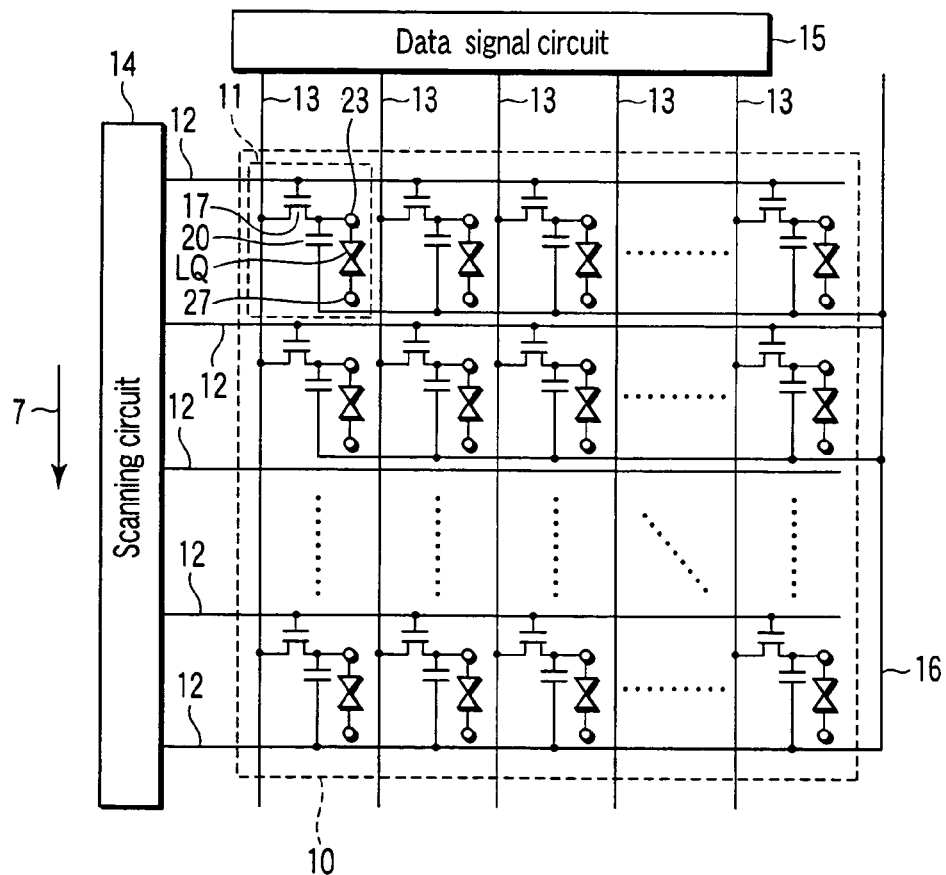
FIG. 2 is a diagram showing the circuit configuration of the liquid crystal display panel shown in FIG. 1.

FIG. 1 shows the plane structure of the liquid crystal display panel LCD, FIG. 2 schematically shows the circuit configuration of the liquid crystal display panel LCD, FIGS. 3A to 3C shows the cross sectional structure of the liquid crystal display panel LCD. As shown in FIG. 1, the liquid crystal display panel LCD includes an array substrate 1, a counter substrate 2, and a liquid crystal layer LQ held between the array substrate 1 and the counter substrate 2. The array substrate 1 and counter substrate 2 are a pair of electrode substrates, and bonded by use of a sealing resin layer 3, which is applied to surround a liquid crystal filling space between the substrates 1 and 2 and form an open part left as an inlet 4. The liquid crystal layer LQ is obtained by filling the liquid crystal filling space, for example, with a nematic liquid crystal material from the inlet 4, and sealing the inlet 4 with a sealing member 5.

In the liquid crystal display panel LCD, a display screen is formed of a plurality of pixels 11 shown in FIG. 2. The array substrate 1 includes a plurality of pixel electrodes 23 arrayed in a matrix form in a display area 10 corresponding to the display screen, a plurality of scanning electrodes 12 extending along the rows of pixel electrodes 23, a plurality of data signal electrodes 13 extending along the columns of pixel electrodes 23 and a plurality of thin-film transistors (TFTs) 17 disposed near the intersections of the scanning electrodes 12 and the data signal electrodes 13 as pixel switching elements, a plurality of storage capacitances 20 at one end connected to the pixel electrodes 23, a scanning circuit 14 connected to the scanning electrodes, and a data signal circuit 15 connected to the data signal electrodes 13. Each scanning electrode 12 is connected to the gates of the thin-film transistors 17 of a corresponding row, each data signal electrode is connected to the drains of the thin-film transistors 17 of a corresponding column. Each pixel electrode is connected to the source of a corresponding thin-film transistor 17. The storage capacitances are connected at the other end to a common wiring 16. In this case, each thin-film transistor 17 is formed as an n-channel MOS transistor. The counter substrate 2 includes a counter electrode 27 facing the pixel electrodes 23. Each pixel 11 includes the pixel electrode 23, the counter electrode 27, and a part of the liquid crystal layer LQ which is located between the pixel electrode 23 and the counter electrode 27, and forms a liquid crystal capacitance for holding a drive voltage corresponding to a potential difference between the pixel electrode 23 and the counter electrode 27. The storage capacitance 20 is provided in parallel with the liquid crystal capacitance to ensure that the drive voltage is held stably.

The scanning circuit 14 outputs a scanning signal sequentially supplied to the scanning electrodes 12 in a direction 7 shown in FIGS. 1 and 2 for each horizontal scanning period. The data signal circuit 15 converts a video signal for one row to pixel voltages while each of the scanning electrodes 12 is driven by the scanning signal, and outputs the pixel voltages to the data signal electrodes 13. These pixel voltages are applied to the pixel electrodes 23 of the row via the thin-film transistors 17 for one row which are turned on by the scanning signal. The pixel voltage is a voltage applied to the pixel electrode 23 with respect to a common voltage applied to the counter electrode 23 and serving as a reference. The pixel voltage is inverted in polarity against the common voltage for each frame period and for each horizontal scanning period, for example. The transmittance of each pixel 11 is controlled by the drive voltage between the pixel electrode 23 and the counter electrode 27.

As shown in FIG. 3A, in the array substrate 1, the pixel electrodes 23 are formed on a transparent insulating substrate 22 such as a glass substrate, and covered with an alignment film 24. In the counter substrate 2, the counter electrode 27 is formed on a color filter layer 26 covering a transparent insulating substrate 25 such as a glass substrate, and covered with an alignment film 28. The array substrate 1 and the counter substrate 2 are bonded such that the alignment films 24 and 28 are set to be in contact with the liquid crystal layer LQ. The liquid crystal display panel LCD further includes a pair of retardation films 30 for optical compensation, a pair of polarizing plates 31, and a backlight 32 serving as a light source. The pair of retardation films 30 are attached to the transparent insulating substrates 22 and 25 on the sides opposite to the liquid crystal layer LQ, and the pair of polarizing plates 31 are attached to the pair of retardation films 30. The backlight 32 as the light source is disposed next to the polarizing plate 31 on the array substrate 1 side.

In the liquid crystal display panel LCD, the alignment film 24 and the alignment film 28 are subjected to rubbing treatment in directions parallel to each other. In FIG. 1, RD1 denotes the rubbing direction of the alignment film 24, and RD2 denotes the rubbing direction of the alignment film 28. This allows the liquid crystal molecules in the liquid crystal layer LQ to be the splay alignment shown in FIG. 3A at the initial state. At this initial state, some of the crystal molecules in the liquid crystal layer LQ in the vicinity of surfaces of the alignment films 24 and 28 are held at high pre-tilt angles (5° to 12°) with respect to the surfaces of the alignment films 24 and 28.

Figure 4:
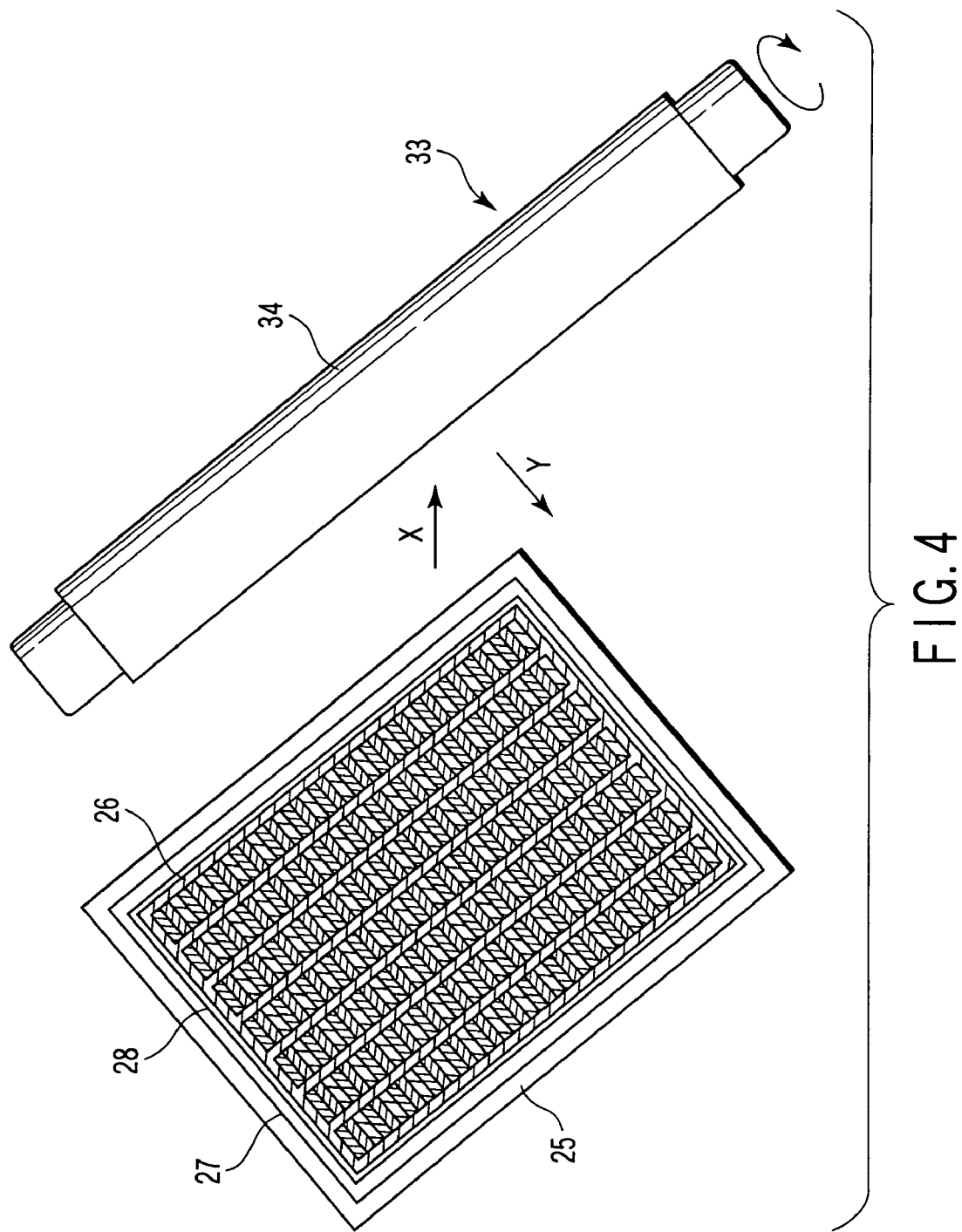
FIG. 4 is a diagram showing rubbing treatment applied to each alignment film shown in FIGS. 3A to 3C.
Figure 5A:
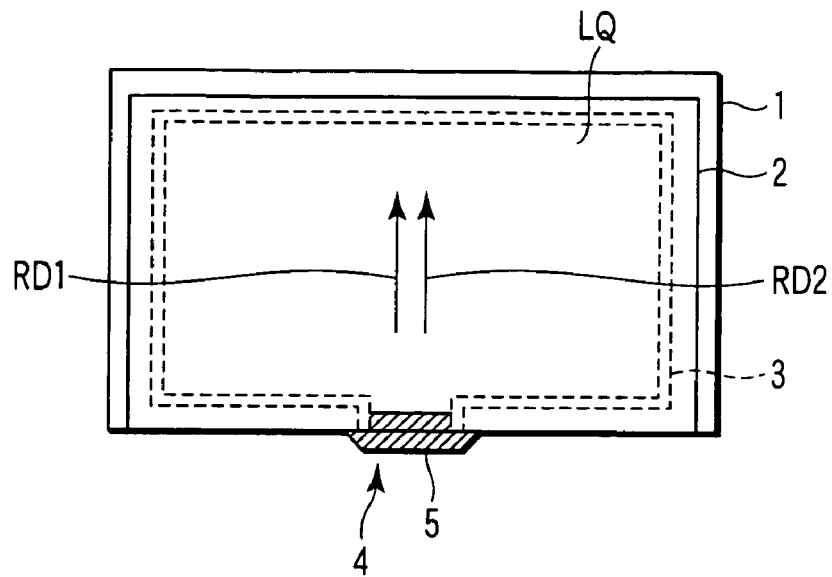
FIGS. 5A to 5D are plan views explaining a problem that occurs in an OCB mode liquid crystal display panel.
Figure 5B:
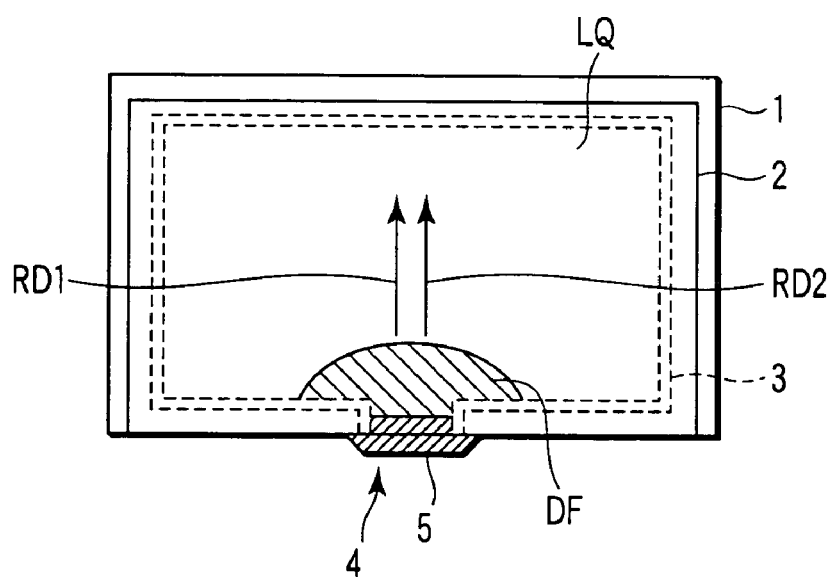
Figure 5C:
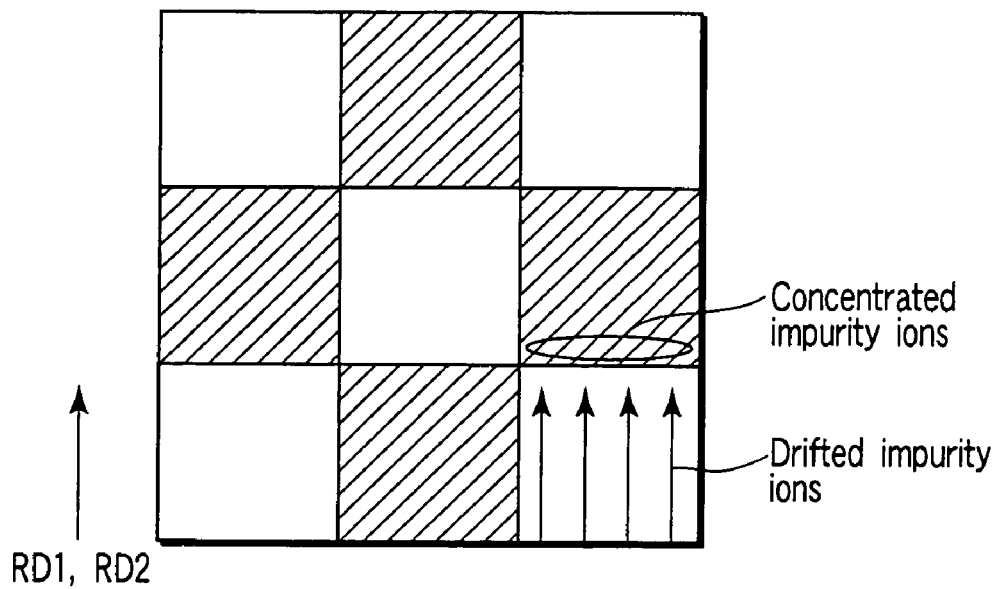
Figure 5D:
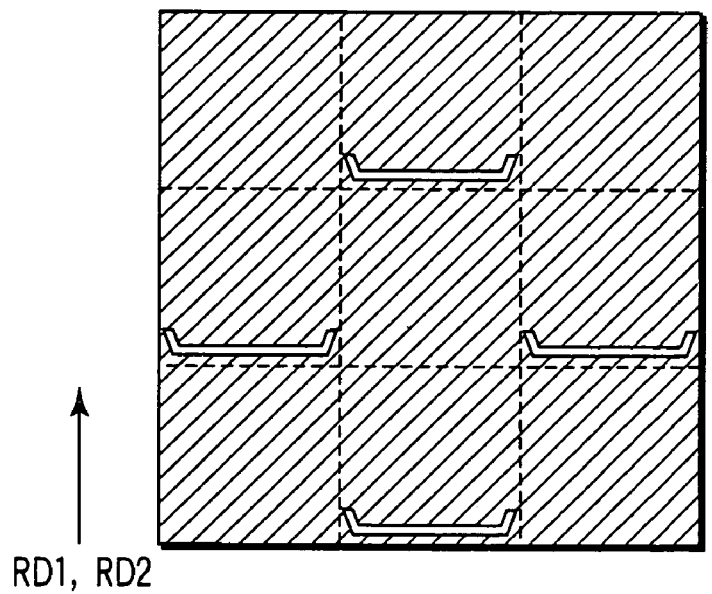

The above-mentioned rubbing treatment is carried out as shown in FIG. 4. In this rubbing treatment, the array substrate 1 and the counter substrate 2 are prepared in the same manner as other modes, wherein the two alignment films 24 and 28 are deposited by coating the array substrate 22 and the counter substrate 25 with an alignment film material. Each of the array substrate 1 and the counter substrate 2 is placed on a stage unit such that the long sides are set parallel to the rotation axis of a rubbing roller 33, and moved together with the stage unit in the direction of an arrow X across the rubbing roller 33. On the rubbing roller 33, a rubbing cloth is wound. This rubbing cloth is set in contact with the alignment film 24 or 28 and rotates along with the rubbing roller 33. Thus, each of the array substrate 1 and the counter substrate 2 is rubbed in the rotational direction of the rubbing roller 33, that is, the direction of an arrow Y perpendicular to the rotation axis of the rubbing roller 33.

In the liquid crystal display panel LCD, upon supply of power, the scanning circuit 14 and the data signal circuit 15 are configured to perform an initialization process for applying a transfer voltage different from the display voltage to all the pixels 11 as the drive voltage to transfer the alignment state of the liquid crystal molecules from the splay alignment to the bend alignment shown in FIGS. 3B and 3C. FIG. 3B shows the bend alignment obtained upon application of a white display voltage, and FIG. 3C shows the bend alignment obtained upon application of a black display voltage. The white display voltage in the black insertion driving is set to zero or a small value close to zero, and allows the pixel 11 to be in a high luminous state for transmitting light from the backlight 32 at the highest transmittance. If the black insertion driving is not employed, the white display voltage should be set to a small value (in a range, for example, of 1 to 2 V) at which the bend alignment of the liquid crystal molecules would not be inverse-transferred to the splay alignment. In contrast, the black display voltage is a value greater than the white display voltage, and allows the pixel 11 to be in a low luminous state for transmitting light from the backlight 32 at the lowest transmittance. The luminance of each pixel 11 varies in the range between the black display level and the white display level in order to display an image.

Further, the scanning circuit 14 and the data signal circuit 15 are configured to perform the black insertion driving in the display operation after the initialization process. In this black insertion driving, an inverse-transfer preventing voltage identical to the black display voltage is sequentially applied to the rows of pixels 11 (the liquid crystal layer LQ) in the scanning direction 7 at a predetermined black insertion ratio for each frame period.

In manufacture of the liquid crystal display panel, an aging process is performed after the above-mentioned forming step in which the array substrate 1, the counter substrate 2, the liquid crystal layer LQ, the pair of alignment films 24 and 28, for example, are formed as one display panel. In the aging process, a black display voltage and a white display voltage are alternately applied to the liquid crystal layer LQ for each frame period to obtain a flow of the liquid crystal molecules in the rubbing directions of the alignment films. This aging process is continued for a predetermined period required for moving impurity ions contained in the liquid crystal layer LQ outside the display area 10. The black display voltage and black insertion ratio for the aging process are determined independently from the black display voltage and black insertion ratio of the black insertion driving for preventing the alignment state of the liquid crystal molecules from being inverse-transferred from the bend alignment to the splay alignment. As a result of the aging process, the concentration of the impurity ions contained in that part of the liquid crystal layer LQ which is located inside the display area 10 is set to a low value that falls within a range of ½ to ⅕ of the concentration of the impurity ions contained in that part of the liquid crystal layer LQ which is located outside the display area 10.

In the case where the rubbing directions RD1 and RD2 coincide with the scanning direction 7 from the uppermost side to the lowermost side of the screen as shown in FIG. 1, the impurity ions are drifted downward in the pixels 11 of one row by the drive voltage which is periodically changed between the white display voltage and the black display voltage, and such downward drift also occurs in the pixels 11 of the subsequent rows sequentially scanned. Thus, the impurity ions are continuously moved towards the lower end of the screen as indicated by an arrow 8, and ultimately swept out from the display area 10. Accordingly, by performing the aging process, it is possible to suppress non-uniformity in display caused by the impurity ions unevenly concentrated in the display area 10 during the black insertion driving for displaying an image on the liquid crystal display panel.

Once the rubbing directions RD1 and RD2 have been determined to coincide with the scanning direction 7 as described above, the movement of impurity ions can efficiently be carried out in the aging process. Even if the directions RD1 and RD2 are not opposite to the scanning direction 7, it is possible to ensure sweeping of the impurity ions by appropriately setting the conditions for the aging process. For example, the black display voltage for the aging process has been set to 6 V, which is slightly greater than the black display voltage (=5 V) for the black insertion driving. When this voltage for the aging process falls within a range, for example, of 5 to 6 V, an improved effect can be obtained in the aging process.

It was found that the efficiency of sweeping the impurity ions was improved by an increase in the black insertion ratio for the aging process, that is, the ratio of the application period of the black display voltage to the total application period (1 frame period) of the black and white display voltages. However, an optimum value ranging from 50 to 80% exists in the black insertion ratio for the aging process. In the embodiment, the black insertion ratio of 70% is employed in the aging process and a favorable effect was obtained.

It was also found that the higher the aging process temperature, the more the impurity ions were swept out. In the embodiment, the aging process temperature was set to 60° C. and a favorable effect was obtained. However, when the process temperature is high exceeding NI temperature, the effect was declined. The polarization plate may be damaged by an increase in the aging process temperature. Hence, the upper limit of the aging process temperature is 70° C. It was found that the effect by heating was somehow noticeable at 40° C. or higher.

The longer the aging process time, the more the effect will be increased. It was found that one hour or longer was enough to obtain the effect of sweeping the impurity ions. The effect was saturated when the aging process continued for twelve hours. Therefore, the length of the aging process time is preferably between one hour and twelve hours. When a relationship between the sweeping effect of the impurity ions and the aging process time is considered from a view point of the production efficiency, the length of the aging process time is preferably three to five hours. In the embodiment, the aging process time was set to three hours and a favorable effect was obtained.

In addition, it is preferable that a dummy electrode is provided in an external area located next to the upper or lower side of the display area 10 which corresponds to an end in the rubbing direction, and a white display voltage is always applied to the dummy electrode. In this case, it is possible to obtain an effect in which the impurity ions are moved ultimately to a position apart from the side of the display area 10.

Although the embodiment of the present invention is intended for the elimination of non-uniformity in display that is observed as burn-in portions appearing near the boundary between the black and white display regions, the present invention is not limited to the embodiment and applicable to other types of non-uniformity in display. For example, there is a case where non-uniformity in display is observed at a location which is inner by about 2 mm in the black display region because of thermal diffusion. Also, in the embodiment, the flow in the rubbing direction is a primary cause for drift of the impurity ions in the description. However, there is a case where the impurity ions are drifted by the flow in an opposite direction. In other words, it is determined which flow the drift is caused depending on the mobility of ions. In any case, the non-uniformity in display can be suppressed if the impurity ions are successfully swept away by means of the aforementioned aging process.

In the aforementioned embodiment, the scanning circuit 14 and the data signal circuit 15 are composed of the thin-film transistors formed on the array substrate 1 of the liquid crystal display panel LCD. These circuits 14 and 15 may be replaced by integrated circuits (ICs) that are provided externally to the liquid crystal display panel LCD.

Further, the present invention is applicable to OCB mode liquid crystal display panels in which no black insertion driving is performed. In this case, the bend alignment is easily inverse-transferred to the splay alignment if the white display voltage of 0 V is used for the aging process. To prevent the inverse-transfer, it is preferable that the white display voltage for the aging process is set to a small level which falls within a range of 1 to 2 V.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for manufacturing an OCB mode liquid crystal display panel, which comprises:

forming a pair of electrode substrates, a liquid crystal layer which is held between said pair of electrode substrates and has liquid crystal molecules whose alignment state is controlled within a display area by a drive voltage applied from said electrode substrates, and a pair of alignment films which are disposed on said electrode substrates in contact with said liquid crystal layer and whose rubbing directions are set parallel to each other, as one display panel; and performing an aging process for obtaining a flow of the liquid crystal molecules in the rubbing directions of the alignment films by applying to said liquid crystal layer a drive voltage that periodically changes in a black insertion ratio determined independently from that of black insertion driving for preventing the alignment state of the liquid crystal molecules from being inverse-transferred from a bend alignment to a splay alignment, said aging process being continued for a predetermined period required for moving impurity ions contained in said liquid crystal layer outside said display area, wherein substantially black and substantially white display voltages are alternately applied for each frame period as the voltage for said aging process, and said predetermined period is within a range of 1 to 12 hours for which said aging process is continued.

2. The method according to claim 1, wherein the black insertion ratio in said aging process exceeds the black insertion ratio for the black insertion driving.

3. The method according to claim 2, wherein the black insertion ratio in said aging process is 50% or more.

4. The method according to claim 3, wherein the black insertion ratio in said aging process falls within a range of 50 to 80%.

5. The method according to claim 1, wherein the black display voltage in said aging process is greater than the black display voltage for the black insertion driving.

6. The method according to claim 1, wherein said aging process is performed at an aging process temperature exceeding 40° C.

7. The method according to claim 1, wherein said predetermined period falls within a range of 3 to 5 hours for which said aging process is continued.

8. An OCB mode liquid crystal display panel, comprising:
a pair of electrode substrates;
a liquid crystal layer which is held between said pair of electrode substrates and has liquid crystal molecules whose alignment state is controlled within a display area by a drive voltage applied from said electrode substrates; and
a pair of alignment films which are disposed on the electrode substrates in contact with the liquid crystal layer and whose rubbing directions are set parallel to each other;
wherein the concentration of the impurity ions contained in that part of said liquid crystal layer which is located inside said display area is lower than the concentration of the impurity ions contained in that part of said liquid crystal layer which is located outside said display area, and
wherein a dummy electrode is further provided in an external area located next to a side of said display area corresponding to the end of the rubbing direction and that receives a voltage always applied thereto, said liquid crystal layer is surrounded by a sealing layer between said electrode substrates, and a liquid crystal inlet is provided in a part of said sealing resin layer on a side of the end of the rubbing direction and sealed by a sealing member.

* * * * *